W. H. MOZINGO.
SAW GUMMER AND SWAGER.
APPLICATION FILED AUG. 15, 1911.
1,040,385.
Patented Oct. 8, 1912.
3 SHEETS—SHEET 2.
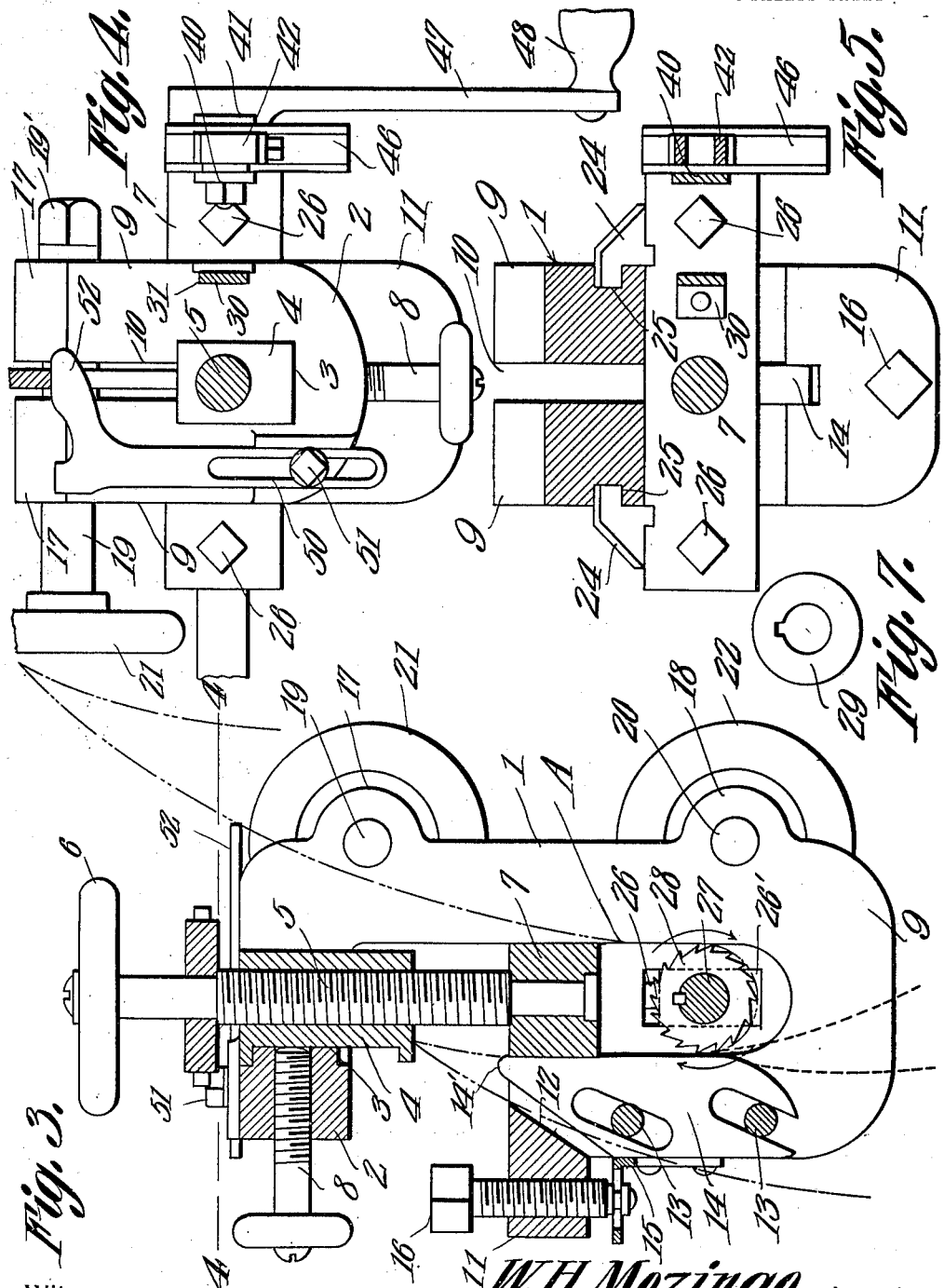
Witnesses
W. H. Mozingo Inventor,
by C. A. Snow & Co.
Attorneys.

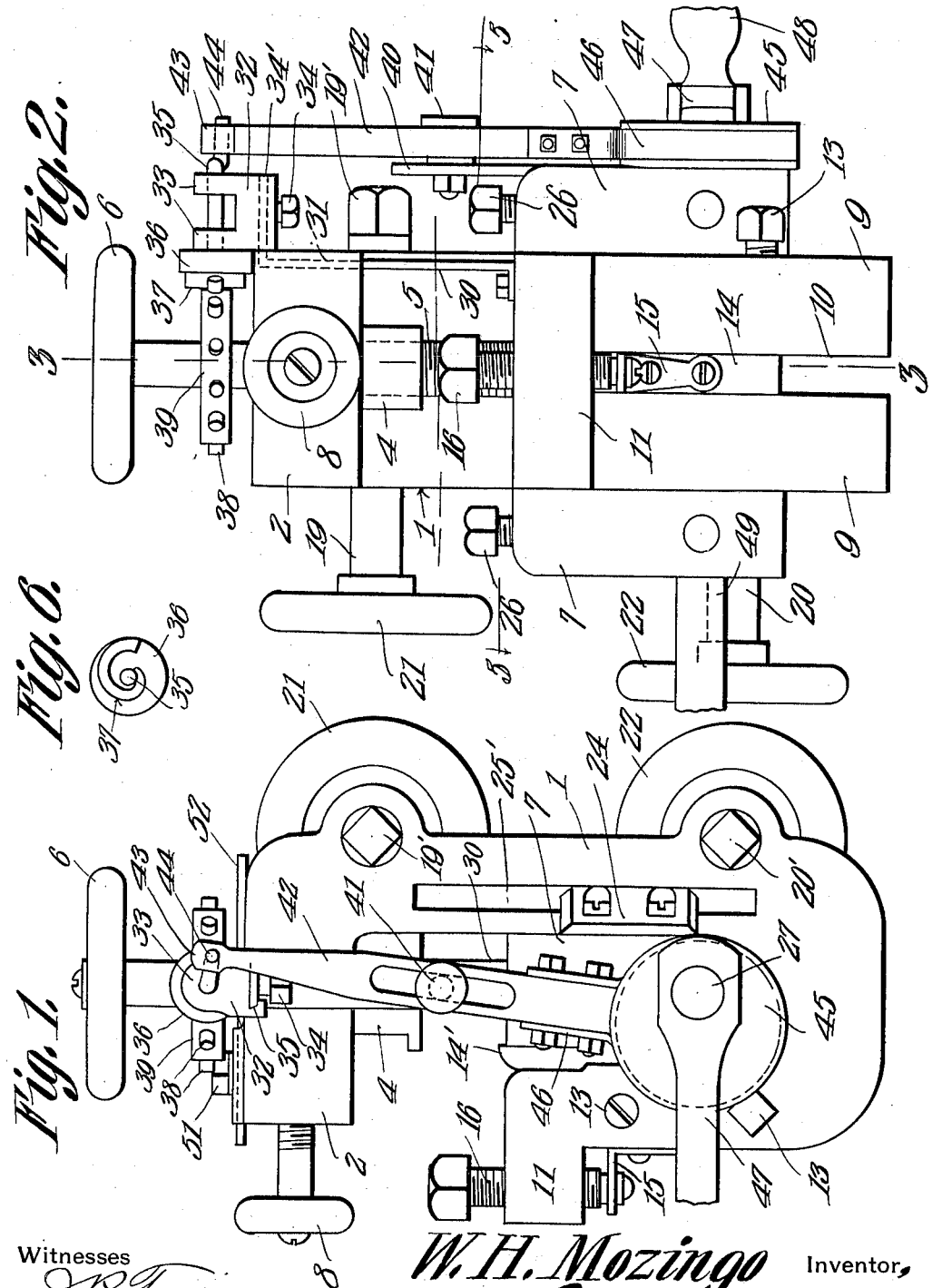

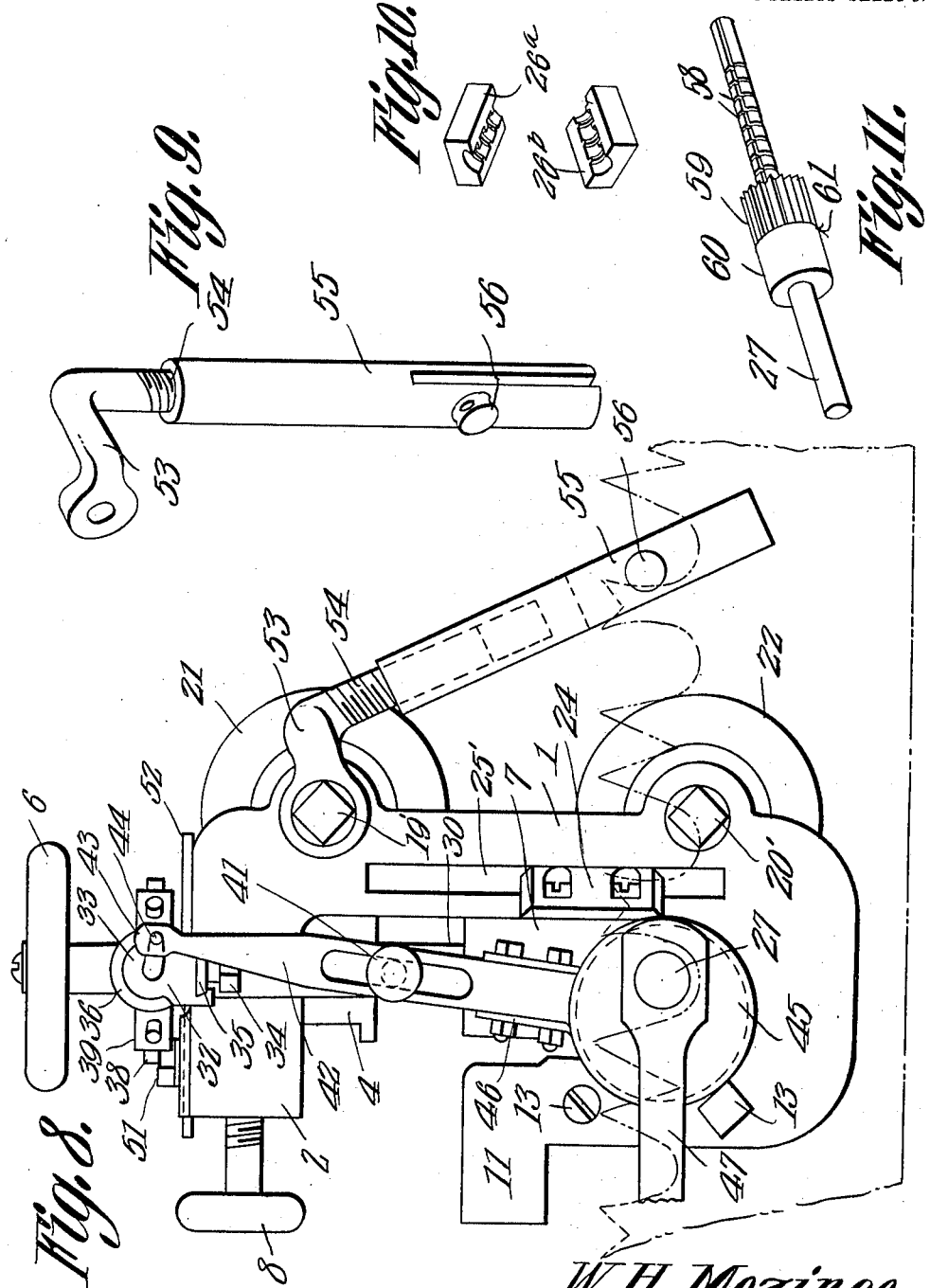

UNITED STATES PATENT OFFICE.

WILLIAM H. MOZINGO, OF HURDLAND, MISSOURI.

SAW GUMMER AND SWAGER.

1,040,385.    Specification of Letters Patent.    Patented Oct. 8, 1912.

Application filed August 15, 1911. Serial No. 644,232.

*To all whom it may concern:*

Be it known that I, WILLIAM H. MOZINGO, a citizen of the United States, residing at Hurdland, in the county of Knox and State of Missouri, have invented a new and useful Saw Gummer and Swager, of which the following is a specification.

This invention relates to improvements in saw gummers and swagers, and the primary object of this invention is the provision of a device adapted to be attached to a circular saw and provided with means for rolling out and flattening the point to produce a swaging action without the usual driving and hammering that is considered necessary, in combination with a rotary means adapted to be substituted in lieu thereof to enter between the teeth and gum the same to produce the desired results.

A further object of this invention is the provision of a tool provided with clamping means and with a slot whereby the said tool is mounted upon and clamped to straddle the cutting edge of a circular or lumber saw, combined with an adjustable rotary swaging and gumming disk with co-acting means for feeding the screw and the rotary swaging or gumming disk so as to feed the said swaging disk or gumming disk toward the saw tooth or throat operating thereupon, thus providing a simultaneous action and an even feed to produce the desired result in swaging or in producing a desired throat to the saw.

A still further object of this invention is the provision of a frame provided with a slot to fit upon and straddle the cutting edge of a circular saw, the same being provided with means to limit the movement of a saw tooth during the swaging action thereof, a yoke carrying a rotary swaging disk being slidably mounted in said frame while operably connected to the shaft carrying the swaging disk with means for actuating the feed screw to operate the yoke and feed the swaging disk under pressure during the rotary action to produce the desired spreading of the tooth, without the usual hammering or driving action.

In connection with this tool is employed a bur or toothed cutter adapted to be inserted within the throat of the saw to gum the same, the same mechanism being employed for gumming and for swaging, except that the blade or tooth of the saw is projected within the frame at a different angle.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings:—Figure 1 is a side elevation of the complete tool. Fig. 2 is a front elevation thereof. Fig. 3 is a vertical central sectional view taken on line 3—3 of Fig. 2, dotted line showing the position of a saw during the gumming operation. Fig. 4 is a sectional view taken on line 4—4 of Fig. 3. Fig. 5 is a section taken on line 5—5 of Fig. 2. Fig. 6 is a detail view of the worm for actuating the feeding of the gumming and swaging yoke during the rotation of the gumming and swaging disk. Fig. 7 is a detail view of the swaging disk *per se*. Fig. 8 is a view demonstrating the device in use as gumming a cross-cut saw. Fig. 9 is a perspective view of an adjustable clamp used to retain the device during the gumming of a cross cut saw. Fig. 10 is a detail detached perspective view of boxing or adjusting means for effecting the transverse adjustment of the saw swaging and gumming shaft. Fig. 11 is a detail perspective view of the main shaft with a modified form of tool in the form of a combined gumming and swaging disk.

Referring to the drawings, the numeral 1 designates the frame which is provided at its upper end with the angle portion or projection 2 having a central bore 3 therein, in which is slidably and adjustably mounted, a bushing or collar 4 whose central bore is threaded for the reception of the feed or clamping screw 5. This feed screw 5 is provided at its upper end with an operating hand wheel 6, while its lower end is swiveled transversely to the yoke 7, which is disposed for vertical operation within the throat of the frame. The rotation of the hand wheel 6 in one direction will move the yoke upwardly, while a reverse rotation will move it downwardly, it being more particularly provided to raise the yoke, however, than to lower it, as the yoke is automatically lowered during the gumming and swaging operation as will later appear. In order to lock the collar 4 at the desired adjustment from the projection 2, a lock or set screw 8, is provided. The frame is provided with a long vertical slot 10 forming the spaced members 9 whereby a saw may be inserted between the frame to be acted upon either for swaging or for gumming. In the projection 11 is provided a curved wall 12 and spaced between the members 9 across the slot are the two removable pins 13 which fit within the slot and guide the sliding and adjustable saw-holding block or clamp 14 having the small upper end 14' adapted to be moved upwardly within the space formed between the members 9 and against the inclined surface 12 of the projection 11, the said clamping device 14 having connected upon its outer face the right angled arm 15 which is pivotally connected to the adjusting screw 16 mounted in the projection 11. The device or clamp 14 is used when it is desired to swage the saw, but when it is desired to gum the saw the same is removed by disconnecting the same from the screw 16, or it may be moved vertically and upwardly to its limit and permit the insertion of the teeth as clearly shown in dotted lines in Fig. 3. The frame at its rear portion is provided with the two alined abutments 17 and 18, to which are mounted the clamping screws 19 and 20 having the operating disks or handles 21 and 22, respectively, the same providing a means whereby the device may be placed to straddle the cutting edge of a saw and said clamping device is operated to engage the saw to retain the device in operative position. In order to properly guide the yoke 7 within the frame and retain the same in its proper vertical movement, the two detachable guides 24 are secured to the arms of said yoke adjacent to the frame 1 and have their rib portion 25 slidably mounted in vertical grooves 25' formed in the side walls of the frame as clearly shown in Figs. 1 and 5. The set screws 19' and 20' are in line with the respective clamping screws 19 and 20 and by the manipulation of the respective screws various widths of saws may be accommodated within the frame and properly centered.

Carried by the respective arms of the yoke are the two adjusting screws 26 in which pass downwardly through said arms and operate upon the boxes 26' journaled in the ends of said arms and carrying the shaft 27, for movement thereon, so that the same may be removed and have placed thereon either the removable and interchangeable saw gumming disk 28 or the removable and interchangeable swaging disk 29, the disk 28 being a toothed disk when it is desired to cut or gum within the throat of the saw, whereas in the swaging disk, a plain cylindrical disk, is employed to swage or force the point of the saw to engage the clamping device 14. By this means, the swaging disk 29, being rotated in the direction of the arrow Fig. 3, there is produced on the saw tooth a flattened drawn point instead of a battered one, such battering tending to mash the grain of the metal and making it brittle, whereas by rolling or drawing, as in the present instance, the metal is not injured, but a better cutting point is provided by the rolled or drawn action. Both the disks 28 and 29 are provided with key ways so that they may be removably keyed to the shaft 27.

Secured to the yoke 7 and projecting upward therefrom and carried thereby is a support 30, the same being a narrow plate and mounted within a groove or slot 31 of the projection 2 and in line with the feed screw 5, as clearly shown in Fig. 4, the same carrying at its upper end a boxing or journal 32 having two eyes which are journaled at 33, while in order to hold the said box or journal adjustably to the upper end of the frame 30 a set screw 34 is employed adjacent the right angled end 34' to secure the same within the lower portion of the boxing 32.

Journaled within the bearings 33 of the boxing 32 is a shaft 35, upon whose inner end is carried the disk 36 provided with the cam or worm 37 adapted to mesh with the teeth 38 carried by the disk 39 upon the feed screw 5, whereby any rotation imparted to the shaft 35 will transmit the same motion to the worm 37 and thereby rotate the disk 39, which is fast to feed screw 5 to move the yoke 7 and its swaging or gumming disks downwardly to act upon the saw as desired.

Secured to the outer face of the arm of the yoke 7 upon the same side as the frame 30 is a standard 40, to which is pivoted intermediate of its ends by means of adjustable journal or pivot 41, the lever 42, whose upper end 43 is pivotally connected to the crank arm 44 of the shaft 35, the lower end thereof being provided with a strap 46 surrounding the eccentric 45 which is connected eccentrically to one end of the shaft 27. The shaft 27 is provided with a lever 47 and crank 48, whereby the said shaft 27 may be rotated, the same rotating the eccentric 45 so as to oscillate the lower end of the lever 42 imparting a rotary action to the shaft 35 and thereby moving the feed screw 5 and the yoke 7 carrying the swaging or gumming tool, simultaneously with the rotating of said swaging or gumming tool. By this means it will be seen that the feed screw is operated so as to retain the gumming or swaging disk at the desired tension with relation to the saw acted upon within the frame of the device thereby rendering the said feed more even than would be the case when the disk 6 is operated manually to feed the screw.

The shaft 27 may be operated from either end and when this is done, a long shaft 49 is attached at an opposite point to the crank 48, said shaft 49 having a crank whereby the shaft may be rotated.

In order to assist in holding the saw teeth properly in the device, while the saw is being gummed, as shown in dot-and-dash lines Fig. 3, the boot-shaped plate 52 is employed. By reason of the slot 50 and screw 51, this device is slidably and adjustably connected to the upper face of the projection 2 of the frame 1, and when in operable relation is projected outwardly as shown in Figs. 3 and 4 to be over the slot 10, and form an abutting means for the saw tooth. Thus the saw when being gummed, is properly held within the slot 10, by means of the device 52 and the curved wall 12 of the projection 11.

When the device is used to gum regular cross-cut lumber saws, it is held in place as demonstrated in Fig. 8, the saw engaging device, composed of the hooked member 53, being pivoted by the upper set screw 19' to the main frame, and by means of its telescopic connection 54 with the sleeve or member 55, and the clamping end 56, is adjustably connected to the saw as shown in dotted lines Fig. 8.

In Fig. 10 are shown co-acting members of the box 26' which fit within the respective slots of the yoke 7 and have ridges and grooves 26$^a$ and 26$^b$ which co-act with the ridges and grooves 58 of the shaft 27, to permit the shaft 27 to be adjusted transversely in the frame to bring the gumming portion 59, or the swaging portion 60 of the combined gumming and swaging tool 61 (Fig. 11) into position with the saw, the adjustment also being provided to permit of the taking care of the wear upon the single gumming disk 28 or the single swaging disk 29. This boxing 26' is the regular one used with the shaft shown in Figs. 1, 3 and 4 and with the shaft shown in Fig. 11, and renders the positioning of the swaging, or gumming disks shown in Figs. 3 and 7, or the combined gumming and swaging disk shown in Fig. 11 more easily and quickly adjusted upon the shaft 27, said disks being slidably keyed upon the shaft so as to rotate at all times therewith.

In use when the device is gumming a saw as in Fig. 3, dot-and-dash lines, the plate 14 is removed, this plate 14 being used when swaging as in dotted lines in Fig. 3.

By mounting the boxing 32 removably upon the right angled end 34' of the frame 30, the set screw 34 can be released and the boxing 32 slid outwardly to carry the worm 37 out of engagement with the disk 39. The hand wheel 6 may now be rotated so that the screw threads upon the stem 5, will cause the yoke 7 and its shaft 27 to be raised to the desired height. To set the device for operation again, the boxing 32 is moved inwardly to bring the worm 37 into engagement with the disk 39, at which time the set screw 34 is set to clamp the frame 32, rigidly upon the end 34' of the frame 30. As the frame 30 is carried by the yoke 7, the same remains at all times in the same relative position to the disk 39, shaft 35, lever 42 and the shaft 27.

When operating the device to swage a saw tooth, the saw tooth assumes the position as shown in dotted lines, Fig. 3, the shaft 27 being rotated in the direction of the arrow, thus clamping the disk 29 to guard or wedge the point of the saw upwardly and against the lower curved portion of the block 14, the continued rotation of the shaft through the eccentric 47, the lever 42, and the shaft 35, rotating the stem 5 which rotation imparts to the entire yoke 7 and the parts carried thereby, the desired downward movement, so that the swaging disk 29 is brought into gradual and closer engagement with the saw tooth and the desired flattening and drawing of the tooth is accomplished. When the gumming disk 28 is used, the block 14 is removed and the saw teeth assume the position as shown in dot-and-dash lines Fig. 3. The disk 28 is placed within the throat between the saw teeth and the shaft 27 is rotated in the same direction as for swaging, that is the direction of the arrows Fig. 3, the stem 5 feeding the yoke 7 and shaft 27 downwardly, as in the swaging action to give a gradual downward feed to the disk 28, as is done before. As before stated at the end of each operation, the gear 39 and worm 37 are thrown out of engagement and the hand wheel 6 is manually operated to raise the yoke 7 and the shaft 27.

From the foregoing description taken in connection with the drawings, it is apparent that a tool or device made according to this invention may be made very durable, and by reason of the vertically adjustable tool carrying device in combination with the rotary means mounted at one side so as to produce simultaneous operation, in combination with a tool mechanism operably connected with th yoke and rotary portion carried by the yoke, the desired rotation and pressure is imparted to said gumming or swaging disk at the proper time and the proper cutting edge is given the saw.

It will thus be seen that by producing a device of this kind that lumber saws and the circular saws may be operated upon, and that the same may be swaged, the swaging action being more of a drawing action at the point of the tooth than when hammered, this action flaring the cutting side and spreading the ends during the drawing action, instead of battering by the hammering action as is the usual custom, and by means of the substitution of a toothed disk in lieu of the swaging disk, the throat of the saw may be acted upon and the saw properly gummed. It will also be noted that a device of this kind may be made completely of steel so as to make it very durable and compact and inexpensive, and also render the operation of such a tool so simple that the ordinary mill hand may gum or swage the saw, as well as could be accomplished by a saw expert.

What is claimed is:—

1. In a device of this character, a frame adapted to straddle the cutting edge of a saw, a yoke slidably mounted in said frame, a shaft rotatably mounted in said yoke, a feed screw for imparting to the yoke and shaft a sliding movement toward and away from saw-engaging position, a rotary tool removably carried by the shaft, a lever carried by the yoke and operably connected to the shaft to receive a reciprocating movement therefrom, and co-acting means carried by the screw and operably connected to the upper end of the lever for operating the screw to feed the yoke and tool toward the saw during the rotation of the shaft.

2. In a device of this character, a frame adapted to straddle the cutting edge of a saw, a yoke slidably mounted in said frame, a shaft rotatably mounted in said yoke, a feed screw for imparting to the yoke and shaft a sliding movement toward and away from saw-engaging position, a rotary tool removably carried by the shaft, a lever carried by the yoke and operably connected to the shaft to receive a reciprocating movement from the shaft, a crank shaft operably connected to the upper end of said lever, and co-acting means carried by the crank shaft and screw to impart to the screw a movement to feed the tool toward the saw while the shaft is being rotated.

3. In a device of this character, a frame adapted to straddle the cutting edge of a saw, a yoke slidably mounted in said frame, a shaft rotatably mounted in said yoke, a feed screw for imparting to the yoke and shaft a sliding movement toward and away from saw-engaging position, a rotary tool removably carried by the shaft, a lever carried by the yoke and operably connected to the shaft to receive a reciprocating movement from the shaft, a crank shaft operably connected to the upper end of the lever, a worm cam carried by said crank shaft, and a disk keyed to the shaft and having peripheral pins adapted to be engaged by the cam to rotate the feed screw simultaneously with the rotation of the shaft and tool.

4. In a device of this character, a frame adapted to straddle the cutting edge of a saw, a yoke slidably mounted in said frame, a shaft rotatably mounted in said yoke, a feed screw for imparting to the yoke and shaft a sliding movement toward and away from saw-engaging position, a rotary tool removably carried by the shaft, an eccentric mounted upon one end of said shaft, a lever having its lower end connected to the eccentric and pivoted intermediate of its ends to the yoke to receive a reciprocating movement when the shaft is rotated, and co-acting means carried by the screw and the upper end of the lever for imparting to the screw a rotary movement simultaneously with the rotation of the shaft and tool.

5. In a device of this character, a frame adapted to straddle the cutting edge of a saw, a yoke slidably mounted in said frame, a shaft rotatably mounted in said yoke, a feed screw for imparting to the yoke and shaft a sliding movement toward and away from saw-engaging position, a rotary tool removably carried by the shaft, an eccentric mounted upon one end of said shaft, a lever having its lower end connected to the eccentric and pivoted intermediate of its ends to the yoke to receive a reciprocating movement when the shaft is rotated, a toothed disk carried upon the upper end of the feed screw, and a rotatably mounted worm cam disposed in engagement with said disk and operably connected to the upper end of the lever.

In testimony that I claim the foregoing as my own, I have hereto affixed my signature in the presence of two witnesses.

WILLIAM H. MOZINGO.

Witnesses:
ARTHUR R. THOMAS,
G. M. HASHER.

---

Copies of this patent may be obtained for five cents each, by addressing the "Commissioner of Patents, Washington, D. C."